Patented May 11, 1937

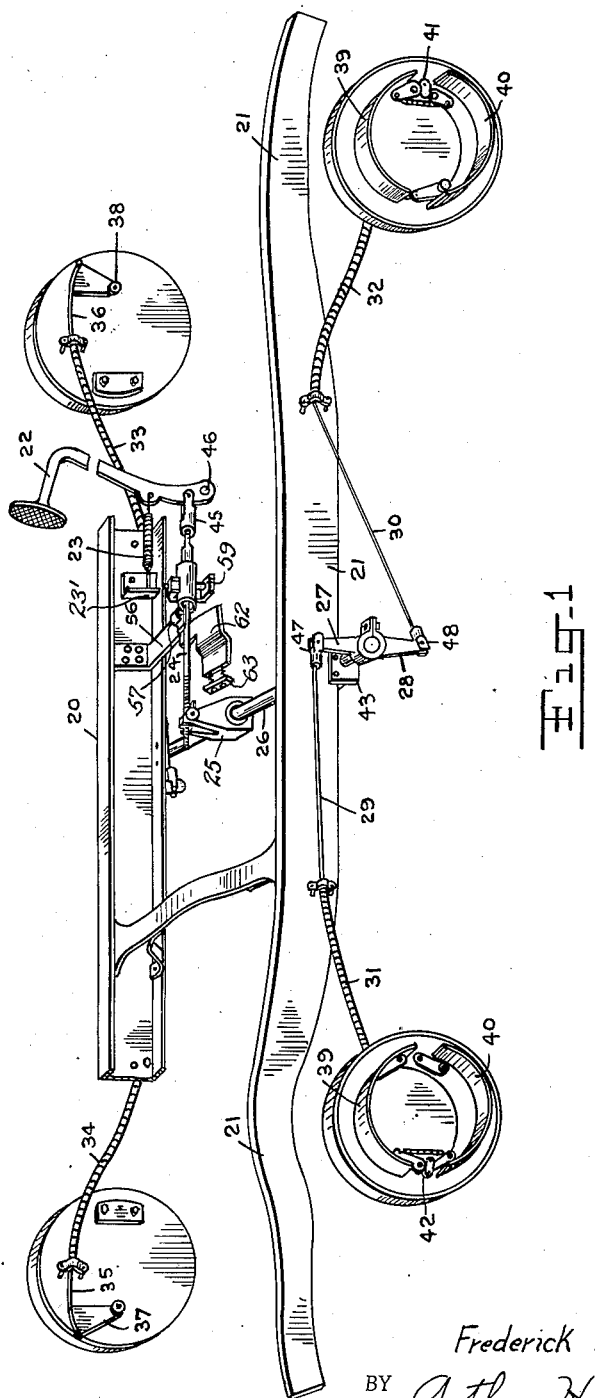

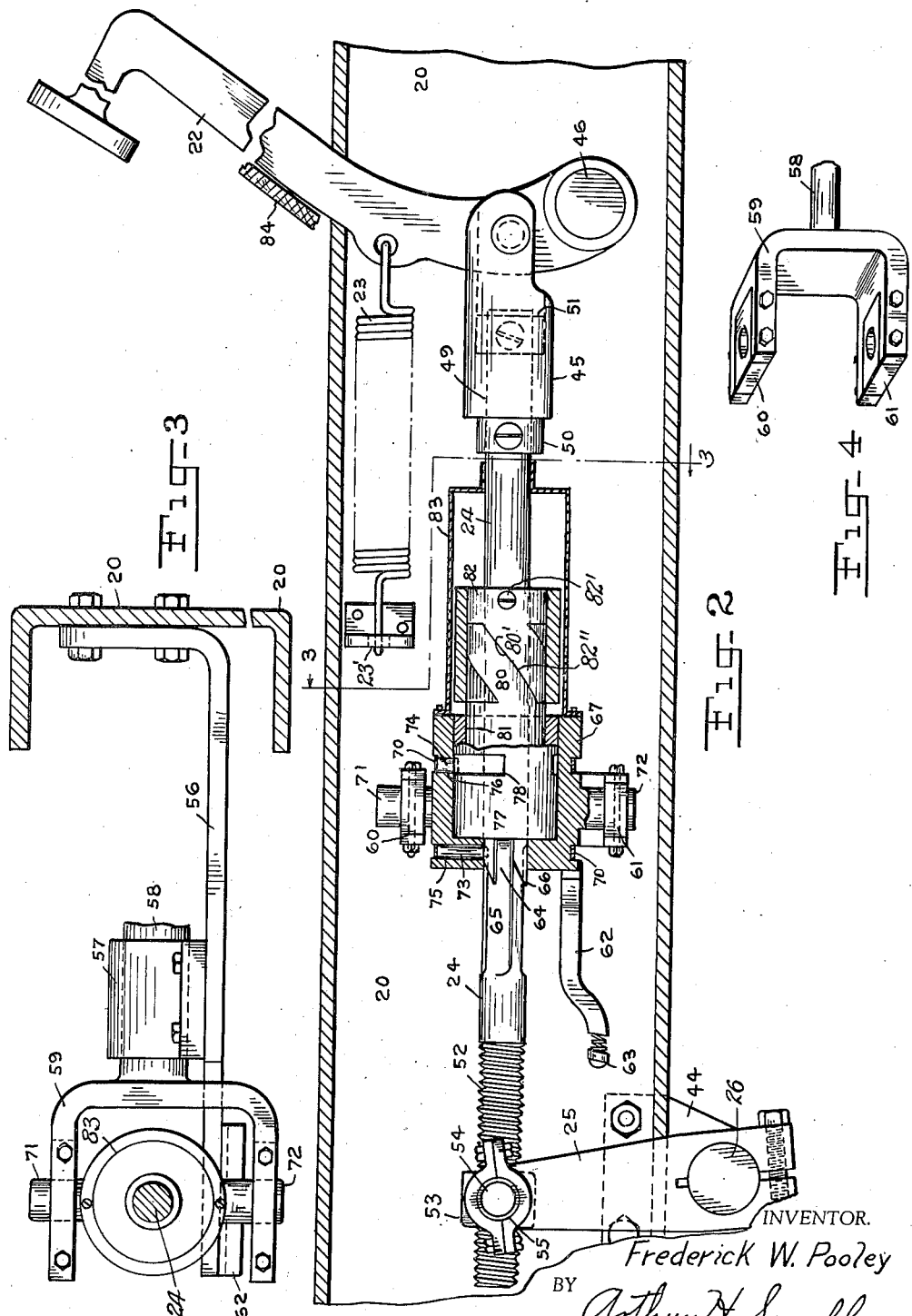

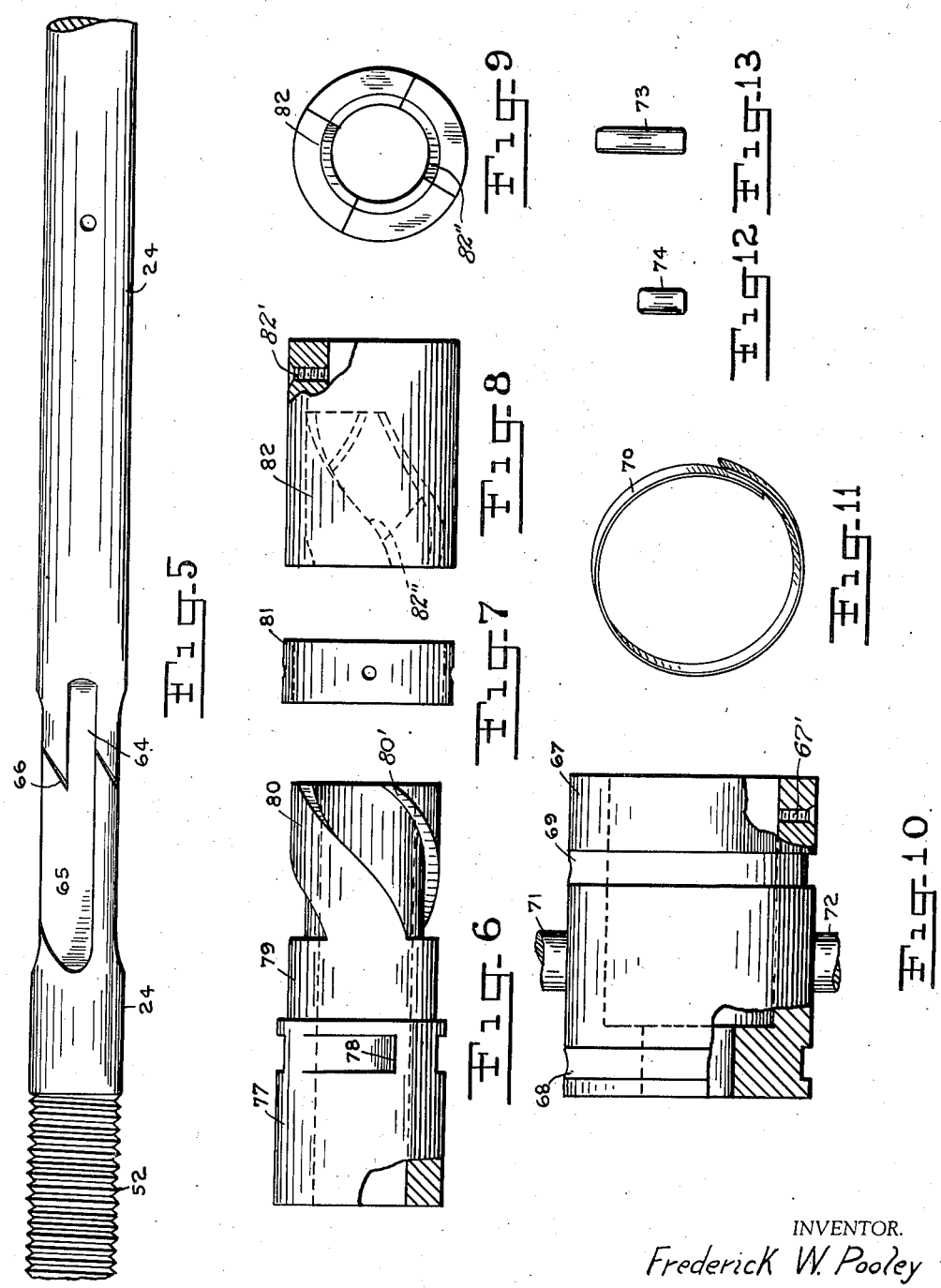

2,079,662

UNITED STATES PATENT OFFICE 2,079,662

BRAKE CONTROL MECHANISM

Frederick W. Pooley, Brooklyn, N. Y.

Application January 28, 1935, Serial No. 3,683

10 Claims. (Cl. 188—196)

My present invention relates in general to a controlling mechanism for braking systems and it particularly pertains to a mechanism of this type which is utilized in connection with automobiles and the like.

The primary object of the invention is to provide a brake controlling mechanism in which the brake pedal leverage ratio is greatly increased, so that manual application of the brakes requires relatively little effort on the part of the operator, and to accomplish this desirable result without necessitating frequent manual adjustment of the braking system. In present day automotive brake design, the brake pedal leverage ratio is approximately 4-to-1, which leverage advantage is substantially the maximum attainable if the travel of the brake pedal is to be confined to limits, which do not require frequent take-up in the system to compensate for backlash in the same and for wear in the brake linings. The braking mechanism constructed in accordance with the invention as herein disclosed obviates the mechanical limitations heretofore restricting the brake pedal lever ratio, so that in the instant case any constant desirable mechanical leverage advantage may be employed.

A further object of the invention is to provide an automatically operative take-up device utilized in connection with the braking system and forming a part of the same to compensate for permanent elongation in the mechanism only as it occurs through cause, in this particular instance, of backlash in the system proper and wear in the brake lining.

Another object is to regulate the degree of movement of the brake pedal and maintain the same within substantially predetermined limits without loss of braking effort, through means of the functioning of the automatic take-up device when the pedal is operable to a designated maximum point of application. The present mechanism also facilitates the regulation, through the same means, of the free movement in the brake system, or the movement of the brake lever up to that point or position where the brake shoes contact the brake drums, so that the same is maintained within substantially constant predetermined limits regardless of the condition of wear throughout the system. A further object is to provide a take-up mechanism, cooperating with a braking system, that will only function when sufficient elongation has occurred in the system to necessitate the same, at which time the mechanism compensates for the elongation so that the movement of the system is kept below a certain predetermined maximum limit.

The invention further contemplates the employment of a yieldable stop in association with the take-up device of the mechanism, which stop serves as a limiting means restricting the degree of movement for the application of the brake and to indicate to the operator that it is necessary to have the brake shoes of the vehicle relined.

Another object of the invention is to provide an arcuate cam operating lever in the braking system by which the force applicable to the cam is always exerted tangentially to the lever arm regardless of the position of application of the brake pedal.

Still another object of the invention is to provide a mechanism of this character which may be readily reset when the brake shoes of the vehicle are relined.

My invention also includes other objects, advantages and novel features of construction and arrangement hereinafter more particularly referred to, with the detailed description of the same, in connection with the accompanying drawings which illustrate the invention in its preferred mechanical embodiment.

Referring to the drawings:

Fig. 1 is a perspective view showing the controlling mechanism in assembled relationship mounted upon the chassis of an automobile;

Fig. 2 is an enlarged side elevation, partly in section, of the portion of the mechanism hereinafter termed the take-up device;

Fig. 3 is a cross section of the device taken on line 3—3, Fig. 2;

Fig. 4 is a detailed perspective view of the U-shaped holding member employed for yieldingly positioning the body or casing of the take-up device;

Fig. 5 is a detailed side elevation of the rod member of the take-up device;

Fig. 6 is a similar view of the cam follower and ratchet element of the mechanism;

Fig. 7 is a side elevation of the collar employed in the illustrated embodiment of the take-up device;

Fig. 8 is a detailed side elevation of the actuator cam of the device;

Fig. 9 is a front elevation of the cam as shown in Fig. 8;

Fig. 10 is a detailed side elevation of the cylindrical casing or body of the device;

Fig. 11 is a perspective view illustrating the energizing means for controlling the operation of the pawl and guide roller pin of the take-up mechanism;

Fig. 12 is a detailed side elevation of the pawl; and

Fig. 13 is a similar view of the guide roller pin.

With reference particularly to Fig. 1, the form of the vehicle chassis with which the mechanism embodying the present invention is preferably associated is that of an automobile, which customarily employs parallel channel members such as designated in the drawings at 20 and 21 in its construction. It will, however, be understood that the invention is not to be limited in scope to the field of automobile practice, as its usefulness extends to any sort of a braking system in which wear occurs during use. In the form of the invention illustrated, a foot brake pedal 22, mounted for pivotal movement in the usual manner employed in this type of associated device, forms an actuating means for manually exerting sufficient effort to control the braking mechanism of the vehicle. A spring 23 connecting the brake pedal from a fixed point 23' on the chassis provides a means for returning the pedal to its normal inoperative position after use. If desirable, instead of the type of foot lever shown, the actuating lever 22 for the brake system may be constructed in the fashion of a hand brake lever.

The braking system further includes a rod 24, lever 25, shaft 26, levers 27 and 28, brake rods 29 and 30, cable housings 31, 32, 33, and 34, cables 35 and 36, levers 37 and 38, brake shoes 39 and 40 and brake shoe expanding cams 41 and 42. The mechanism, as illustrated, is adapted for use with four-wheel brakes, the parts operating the brakes on the left-hand side of the vehicle, corresponding to those utilized to perform the same function on the right-hand side. In order to eliminate unnecessary duplication, the levers and brake rods on the right-hand side of the vehicle corresponding to those indicated at 27, 28, 29 and 30 are not shown or designated in the drawings. Likewise, the cables 35, 36 and cams 37, 38 shown in the system on the right-hand side of the car are not designated again on the left-hand side. The traverse cross shaft 26, as illustrated, is preferably pivotally mounted in plate members 43 and 44, which are secured to the lower portions of the respective channel members 21 and 20 by means of bolts or otherwise. The levers 25, 27 and 28 are securely clamped or keyed on the shaft 26 so that the same move with rotation of the shaft and consequently motion imparted through lever 25 to the shaft is correspondingly transmitted to levers 27 and 28. Rod 24 of the mechanism joins lever 25 and the brake pedal 22, the forward connection being made in the form of a clevis joint 45. This joint is made relatively close to the fixed pivot point of the pedal lever 22 which is shown in the drawings at 46, so that the leverage advantage afforded the operator of the pedal is as much greater than the customary 4-to-1 leverage ratio as is desired. For practical consideration, sufficient leverage advantage is obtained at a ratio of 6 or 8-to-1, the same greatly decreasing the manual effort needed to be exerted by the operator to apply the brakes of the vehicle.

The brake rods 29 and 30 and cables 35 and 36 of the system are suitably connected, the cables proper being preferably protected by the housings 31, 32, 33 and 34 which are secured in position by brackets or otherwise. The connection of the rods 29 and 30 with the levers 27 and 28 is made through means of clevis joints such as indicated at 47 and 48. A double expansion, internal, type of brake is shown in the drawings for each of the wheels of the vehicle. This customary brake construction includes the brake shoes 39 and 40 and the expanding cam therefor such as designated in the drawings at both 41 and 42, cam 41 being indicated in the wheel at the right-hand front of the vehicle and cam 42 being shown at the right-hand rear of the same. As constructed in accordance with the present inventive conception, the cam actuating lever is arcuately shaped, the same being shown in the drawings for both the front and rear wheels on the left-hand side of the vehicle being respectively designated at 38 and 37. The cable extends over the circular rim or edge of the lever and the end of the same is firmly anchored into position thereon. The pull exerted by the operator of the pedal 22 through the cables of the brake system is consequently exerted at a tangent to the cam operating levers 37 and 38, so that in each instance, the maximum torque for moving the brake cams is obtainable regardless of the position of application of the pedal 22 or of the degree of wear in the brake linings. In accordance with this construction the force exerted by a cable through the lever 38, or any of the other brake cam operating levers on the vehicle, is always perpendicular in relation to a constant lever arm.

With reference particularly to Figs. 2, 3 and 4, indicating the take-up mechanism of the braking system in more detail, the connecting rod 24 for transmitting the motion of pedal lever 22 to lever 25 is further constructed as to be rotatably mounted between the aforementioned pivoting members. The rod 24, which is cylindrical in form at its forward end is retained in a bearing 49 formed by the clevis joint 45. Fixed collar thrust members 50 and 51 on the rod 24 on opposite sides of the bearing 49 provided by the clevis joint prevent any free longitudinal movement of the rod with respect to the pivot members which it joins. The opposite end of rod 24 is threaded as indicated at 52 and makes a screw fastening connection with a pivotally mounted nut 53. This nut is secured between separate forks, or arms, which form the upper portion of the integral lever 25, Fig. 1. The nut is provided with pins 54 extending from opposite sides of the same, each of which form journals and are rotatably secured in bearing members 55, located on the upper extremities of the lever arm 25.

Because of the combination of translational and circulatory movement imparted to the rod 24 by application of the brake pedal, special consideration has been given the mounting of the elements comprising the take-up device in association with the rod. For this purpose I provide a bracket 56, which is bolted, or otherwise secured, to the channel member 20 of the vehicle chassis in a position adjacent that of the rod 24. A bearing 57 on the end of the bracket 56 is adapted to receive a journal pin 58 which extends from the side of a U-shaped holding member 59. The forks of member 59 are constructed to include removable bearing members 60 and 61, which are situated in the assembled construction so the same are respectively above and below the rod 24 and are in vertical alignment therewith. Extending to the rear of the bracket 56 is an integral arm 62, the end of which is provided with a yieldable stop 63. This stop is directly in the forward path of motion of the lever 25 and its position is regulated so that only after considerable wear in the brake system has occurred, will the operator in applying the brakes move the lever 25 against the same.

With reference to the detailed views of the elements comprising the take-up device, as shown in Figs. 5 to 13, inclusive, the rod 24 further includes a plurality of longitudinal slots 64. This portion of the rod is shaped to accommodate the relative movement of a pin thereon in a clockwise direction only, that is to facilitate the movement of the shaft, or rod, 24 in a counterclockwise direction only, inasmuch as the same is rounded to the lower level of one edge of the slot only, as indicated at 65. In accordance with the construction, shaft 24, as viewed in Fig. 3, is only permitted to move in a counterclockwise direction. A pin operating in the slot 64 further prevents any rotational movement of the shaft, or rod, until the same has been moved in a longitudinal direction so that the pin clears the limiting point of the slot indicated at 66. For purposes of illustration, I have constructed the take-up device so that it functions, when cause for the same appears, to rotate the rod, 24, one-quarter of a revolution at a time, so, consequently, I employ four radially equidistant slots 64 about the rod 24. It will further be noted that there is no break in the link or rod connection between the levers 22 and 25.

The housing, or casing, for the take-up device is designated at 67 in Fig. 10. External circumferential slots 68 and 69 are located in the housing for receiving circular springs 70 therein, such as indicated in Fig. 11. The housing, also, integrally includes aligned journal functioning members extending therefrom as indicated at 71 and 72. These extending members 71 and 72 fit in the bearings 60 and 61, respectively, provided for the same in the U-shaped holding member 59. The housing, also, includes radial openings terminating at the circumferentially slotted portions of the same 68 and 69, for receiving circular pins 73 and 74, illustrated in detail in Figs. 13 and 12. The openings in the housing for the pins are respectively designated in Fig. 2 of the drawings at 75 and 76. Pin 74 forms a pawl for the ratchet cylinder of the mechanism, as will be hereinafter described. The springs 70 operatively maintain the pins 73 and 74 within the openings provided for the same in the housing 67.

The interior of the housing is cored out to form a chamber for receiving a ratchet cylinder such as indicated in the drawings at 77, Fig. 6. As the requirements of the instant case specify that the rotatable rod 24 is to function in quarter revolutions, the cylinder 77 is provided with four ratchet stops 78 permitting the rotation of this element in a counterclockwise direction only. The cylinder 77 is rotatably mounted on rod 24, the direction of its permitted rotation being counterclockwise, as viewed when observing the drawings, Fig. 2, looking from right to left, or, from the front, or unthreaded end of the rod 24. With particular reference to Fig. 6, the element 77 of the take-up mechanism also includes a cylindrical collar receiving portion 79 and cam follower 80. A detailed view of the collar provided for rotatably maintaining the ratchet cylinder within the housing 67 is illustrated in Fig. 7 and designated by the number 81 in the drawings. The collar is secured within the housing member 67 by means of a screw or otherwise, as provided for by the tapped opening designated at 67' in Fig. 10 of the drawings. The cam actuating member of the device is clearly shown in Figs. 8 and 9. This member is designated at 82 in the drawings, the same being provided with suitable means as shown at 82' for receiving a locking screw for rigidly securing it in position upon the rod 24. In order to clearly indicate the cam follower 80 and cam actuator 82 in an engaged position, Fig. 2 of the drawings shows the protecting sleeve formation comprising the exterior of the actuator 82 in section. Both cam actuator and follower are designed to include intermeshing gear teeth, shown respectively at 82'' and 80', which are in operative contact at all times. The slope, or pitch, of the teeth is such that translational movement of the actuator cam 82 will rotate the follower cam 80 in a counterclockwise direction to the distance of slightly more than a quarter of a revolution. Elements 67, 77 and 82 of the mechanism are provided with central longitudinal openings permitting the same to be placed in cooperative association along the rod 24, as clearly shown in Fig. 2. A cylindrical casing 83 is also utilized as shown in this figure to enclose the meshing cam parts of the take-up device. The release position of the brake pedal lever 22 is also herein shown as defined or limited by the under side of the floor board of the vehicle indicated at 84.

The operation of the take-up device occurs when the brake pedal movement passes a predetermined maximum limit of travel set for the same in the initial adjustment of the system. As soon as this action takes place, because of the wear in the brake system, the operator will move the pedal through a slightly longer arc, which automatically brings into operation the take-up device. It will be understood that until this point has been reached, the operator of the vehicle in applying the brakes has not parted the actuator and follower cam of the take-up mechanism a sufficient distance to bring it to function. When this maximum limiting point in the elongation of the mechanism is reached, the cam actuator 82 moves forward with the rod 24, under the action of the braking effort placed by the operator upon the pedal lever 22, so that its follower cam 80 is actuated a full quarter of a revolution in a counterclockwise direction, which function correspondingly motivates the ratchet cylinder 77, which is engaged by the pawl or pin 74 in a position 90 degrees from its original starting point. When the operator releases the brake, the pedal returns to its original position under action of the spring 23, and the rod 24, through the influence of the geared cams in coming together to a release position, rotates a quarter of a revolution in a counterclockwise direction. The follower cam 80 being locked in an advanced quarter movement position guides the actuator cam 82 as the same returns to a released position, so that a corresponding turning movement is imparted to the rod 24. This rotational movement transmitted to the braking system through means of the screw thread 52 shortens the distance between the connecting pivot points of the levers 25 and 22, so that the wear or permanent elongation in the system caused by use is automatically compensated for as it occurs. Take-up in the system is thus effected, when necessary, during the release motion of the brake mechanism. The mechanical contraction thus afforded by the rotatable rod 24 permits the regulation of the degree of movement of the brake pedal within predetermined limits and does not increase the manual braking effort required in the process. Because of the automatic control thus exercised upon the pedal lever 22, the free movement of the pedal is also regulated by the same means, so that, regardless of wear in the braking system, the operator will not experience a change in the amount of pedal movement required to initially engage the brakes.

The mechanism further provides means for preventing the rotation of the shaft or rod 24, unless under the influence of the take-up device during action, in the form of the roller pin 73, which operates in the longitudinal slots 64 in the rod. The limiting position 66 of the slots is located so that the pin 73 clears the same only when the forward movement of the rod 24 is sufficiently great to effect an operation of the take-up device.

During the forward and backward movement of the rod 24, the housing for the take-up mechanism adjusts itself to the combination translatory and circulatory motion of the same by shifting in a vertical plane through means of the extending journal pins 71 and 72 and by rotating with the U-shaped holding member 59 on its journal 58.

The stop 63 of the mechanism defines a limiting position for the forward movement of the lever 25, and the contacting of these parts during the application of the brakes by the operator serves to indicate that the brake shoes of the system have become sufficiently worn to be relined, inasmuch as the wear in the braking system has now been taken up as far as it can be safely accomplished.

For initially setting the device, or in resetting the same after the brake shoes have been relined, the bearing connection between the nut 53 and lever 25 is dismantled and the rod 24 lifted therefrom. Required adjustments are then made in the system between the lever 25 and the shoes 39 and 40 until the lever is set in the desired position. The position of the nut 53 on the threaded portion of the rod 24 is then manually regulated until the same fits properly in the bearing adapted to receive it.

In the operation of the brake system, the force applied through lever 25 to turn the shaft 26 is transmitted by means of the levers 27 and 28 to operate the rods and cables joining the same so that the brake cam actuating levers 37 and 38 are moved to cause an expansion of the internal brake shoes against the drums of the wheels of the vehicle. The permanent elongation of the brake system, such as I have illustrated in the present case, is caused principally by backlash in the mechanical joining parts of the mechanism and by wear in the lining of the brake shoes.

The means for compensating for the permanent elongation in the braking system as disclosed in the take-up device forming the mechanical embodiment of the present invention, is capable of being utilized with any known type of automobile braking system now in use with equal effectiveness. Inasmuch as the inventive concepts herein disclosed may be embodied in other desired forms, various modifications of the disclosed improvement may occur to those skilled in the art and may be made without departing from the scope and purview of the invention as claimed.

I claim as my invention:

1. An apparatus of the class described comprising a take-up device including two pivotally mounted levers for transmitting the braking force, a rotatably mounted screw threaded rod joining said levers, a yieldably positioned housing member, a rotatable ratchet mechanism and cam follower associated with said housing, said rod being retained in slidable engagement with the housing, a cam actuator located on the rod meshing with the cam follower, the cam actuator in its forward movement with the rod rotating the follower so that when the movement exceeds a predetermined maximum limit the follower cam is locked in an advanced position through means of the ratchet mechanism, the cam actuator rotating the rod as the meshing cams completely engage during the return movement of the device.

2. An apparatus of the class described comprising a take-up device including two pivotally mounted levers for transmitting the braking force, a rotatable removably mounted screw threaded rod joining said levers, a housing member having a rotatable ratchet mechanism therein, said mechanism slidingly engaging the rod, means for mounting the housing member to provide for vertical and rotary motion of the same with respect to the rod, a cam follower connected to the ratchet mechanism, a cam actuator secured in position on the rod, said cams meshing so that rotary movement is imparted to the follower and ratchet by the actuator during the forward movement of the rod, said ratchet mechanism locking the cam follower in an advanced position when the forward movement of the cam actuator exceeds a predetermined limit, the cam actuator rotating the rod as the meshing cams completely engage during the return movement of the device.

3. A brake control mechanism including pivotally mounted levers, a take-up device connecting said levers, and a fixed stop arm in association with one of said levers, having a yieldable extension piece defining a limiting position for the forward movement of the associated lever to determine the extent of safe operation of the take-up device.

4. A brake control mechanism including pivotally mounted levers, a take-up device connecting said levers, and a stop arm secured in stationary alignment with one of said levers, a yieldable member situated on the end of the arm adjacent to the lever in alignment with the same, said yieldable member defining a limiting position for the forward movement of the lever to determine the extent of safe operation of the take-up device.

5. In a brake control mechanism, a take-up device comprising a unitary rotatably mounted lever-connecting rod, said rod providing means for shortening the distance between the lever members of the mechanism it connects, a housing member including mechanism for rotating said unitary rod to cause a take-up operation, said housing member securing the rod in slidable engagement therein, and being externally movably mounted to shift its position to accommodate the combination translatory and circulatory motion of the rod during operation, the mechanism for rotating the rod being operative on the return motion of the device when the forward movement of the rod with respect to the housing member exceeds a predetermined limit.

6. In a brake control mechanism, a take-up device comprising a unitary rotatably mounted lever-connecting rod, an independent housing member including mechanism to rotate said rod to cause a take-up operation, said housing member securing the rod in slidable engagement therein and being externally movably mounted to shift its position to accommodate the combination translatory and circulatory motion of the rod during operation of the device.

7. A brake control mechanism comprising a take-up device including two pivotally mounted levers for transmitting the braking force, a rotatably mounted screw threaded rod joining said levers, a housing member retaining said rod in slidable engagement therein, said housing being movably mounted to shift its position to accommodate the combination translatory and circulatory motion of the rod during operation, a rotatable ratchet mechanism and cam follower associated with said housing, a cam actuator located on the rod meshing with the cam follower, the cam actuator in its forward movement with the rod rotating the follower so that when the movement exceeds a predetermined maximum limit the follower cam is locked in an advanced position through means of the ratchet mechanism, means for securing the rod against rotation until the movement of the same in a forward direction reaches its predetermined maximum limit, the cam actuator during the return movement of the device rotating the rod to cause a take-up operation as the meshing cams completely engage.

8. In a brake control mechanism, a take-up device comprising a rotatably mounted lever-connecting rod, a housing member including mechanism to rotate said rod on its return movement to cause a take-up operation, said housing member securing the rod in slidable engagement therein and being movably mounted to shift its position to accommodate the combination translatory and circulatory motion of the rod during operation of the device, and means associated with said housing for preventing the rotation of the rod until the forward movement of the same with respect to the housing exceeds a predetermined limit.

9. A brake control mechanism comprising a take-up device including two pivotally mounted levers for transmitting the braking force, a rotatably mounted screw threaded rod joining said levers, a housing member having a rotatable ratchet mechanism therein, said mechanism and housing retaining said rod in slidable engagement therewith, means for mounting the housing member to provide for vertical and rotary motion of the same with respect to the rod, a cam follower connected to the ratchet mechanism, a cam actuator secured in position on the rod, said cams meshing so that rotary movement is imparted to the follower and ratchet by the actuator during the forward movement of the rod, means for securing the rod free from rotation until the forward movement of the same exceeds a predetermined limit, at which time said ratchet mechanism functions to lock the cam follower in an advanced position, the cam actuator rotating the rod to cause a take-up operation during the return movement of the device as the cams completely engage.

10. In a brake control mechanism, a take-up device comprising a unitary rotatably mounted lever-connecting rod, said rod providing means for shortening the distance between the lever members of the mechanism it connects, an independent yieldingly mounted housing member, a cam follower associated with said housing member, a ratchet mechanism adapted to control the movement of the cam follower, said rod being retained in slidable engagement with the housing member, a cam actuator located on the rod meshing with the cam follower, the cam actuator in its motion with the rod rotating the follower so that when the movement exceeds a predetermined limit the follower cam is locked in an advanced position through means of the ratchet mechanism, the cam actuator rotating the rod as the meshing cams completely engage during the return movement of the mechanism.

FREDERICK W. POOLEY.